US005481368A

United States Patent [19]
Ozaki

[11] Patent Number: 5,481,368
[45] Date of Patent: Jan. 2, 1996

[54] FREQUENCY DEMODULATING APPARATUS WITH INVERSION COMPENSATION

[75] Inventor: Hidetoshi Ozaki, Yokohama, Japan

[73] Assignee: Victor Company of Japan, Ltd., Yokohama, Japan

[21] Appl. No.: 178,597

[22] Filed: Jan. 7, 1994

Related U.S. Application Data

[63] Continuation of Ser. No. 899,982, Jun. 17, 1992, abandoned.

[30] Foreign Application Priority Data

Jun. 21, 1991 [JP] Japan ..................... 3-177457

[51] Int. Cl.$^6$ ............................. H04N 5/94; H04N 5/91; H04N 5/213
[52] U.S. Cl. ....................... 358/336; 358/340; 348/607; 360/33.1; 329/318
[58] Field of Search ..................... 358/310, 335, 358/327, 328, 330, 336, 340; 329/318, 341; 348/613, 607; H04N 5/76, 5/78, 5/781, 5/782, 5/783, 9/79, 5/92, 5/95, 5/91, 9/64, 5/14, 5/208, 5/213, 5/94

[56] References Cited

U.S. PATENT DOCUMENTS

| | | | |
|---|---|---|---|
| 4,510,530 | 4/1985 | Miura et al. | |
| 4,731,675 | 3/1988 | Tachibana et al. | |
| 4,862,099 | 8/1989 | Nakai | 358/330 |
| 4,906,942 | 3/1990 | Nakai et al. | 358/327 |
| 4,951,154 | 8/1990 | Sekiguch et al. | |
| 4,998,172 | 3/1991 | Kitazawa et al. | 358/328 |
| 5,057,934 | 10/1991 | Yun et al. | 358/330 |
| 5,084,767 | 1/1992 | Watanabe et al. | 358/340 |
| 5,089,916 | 2/1992 | Kluth | 358/327 |
| 5,136,392 | 8/1992 | Ganse | 358/330 |

FOREIGN PATENT DOCUMENTS 2212017  7/1989  United Kingdom.

OTHER PUBLICATIONS

"All Digital Video Signal Processing System For S–VHS VCR" by Matsumoto, et al. IEEE Transactions on Consumer Electronics, vol. 36, No. 3, Aug. 1990 pp. 563–564.

*Primary Examiner*—Tommy P. Chin
*Assistant Examiner*—Thai Tran
*Attorney, Agent, or Firm*—Lowe, Price, Leblanc & Becker

[57] ABSTRACT

An information reproduction apparatus for reproducing a frequency modulated signal, the information reproduction apparatus having a demodulation portion for demodulating the frequency modulated signal and a deemphasis portion for deemphasis the demodulated frequency modulated signal, comprises: a detection portion for detecting an inversion of levels of the demodulated frequency demodulated signal to produce an inversion detection signal, the inversion being such that the frequency demodulated signal is uncorresponding to the frequency modulated signal when the frequency modulated signal having an image of an edge portion; a compensation portion responsive to the inversion detection signal for compensate the demodulated frequency modulated signal, the compensated demodulated frequency modulated signal being supplied to the deemphasis portion. The apparatus may further comprise a dropout detection portion for detecting dropout of the demodulated frequency modulated signal to produce a dropout detection signal in the presence of the inversion detection signal and the dropout compensation portion responsive to the dropout detection signal for compensating the demodulated frequency modulated signal.

9 Claims, 12 Drawing Sheets

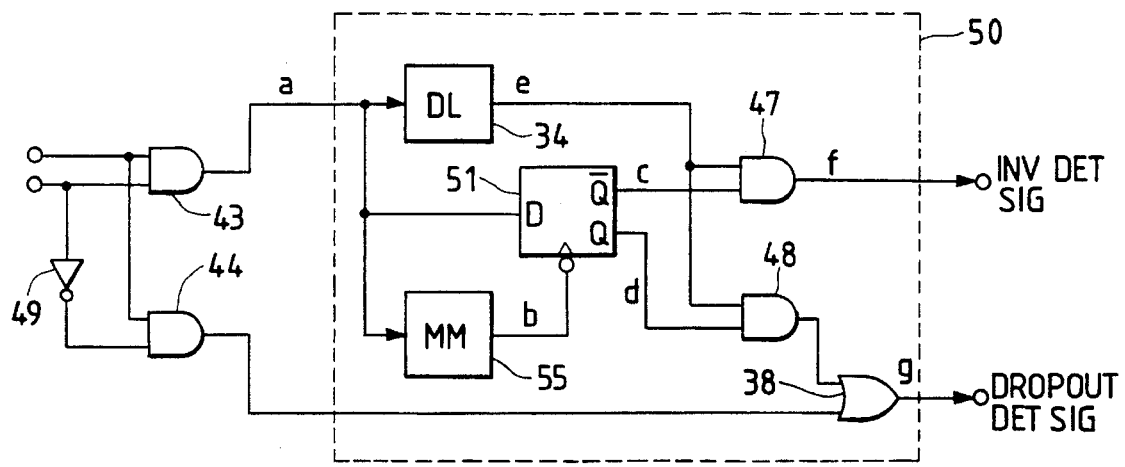
FIG. 11
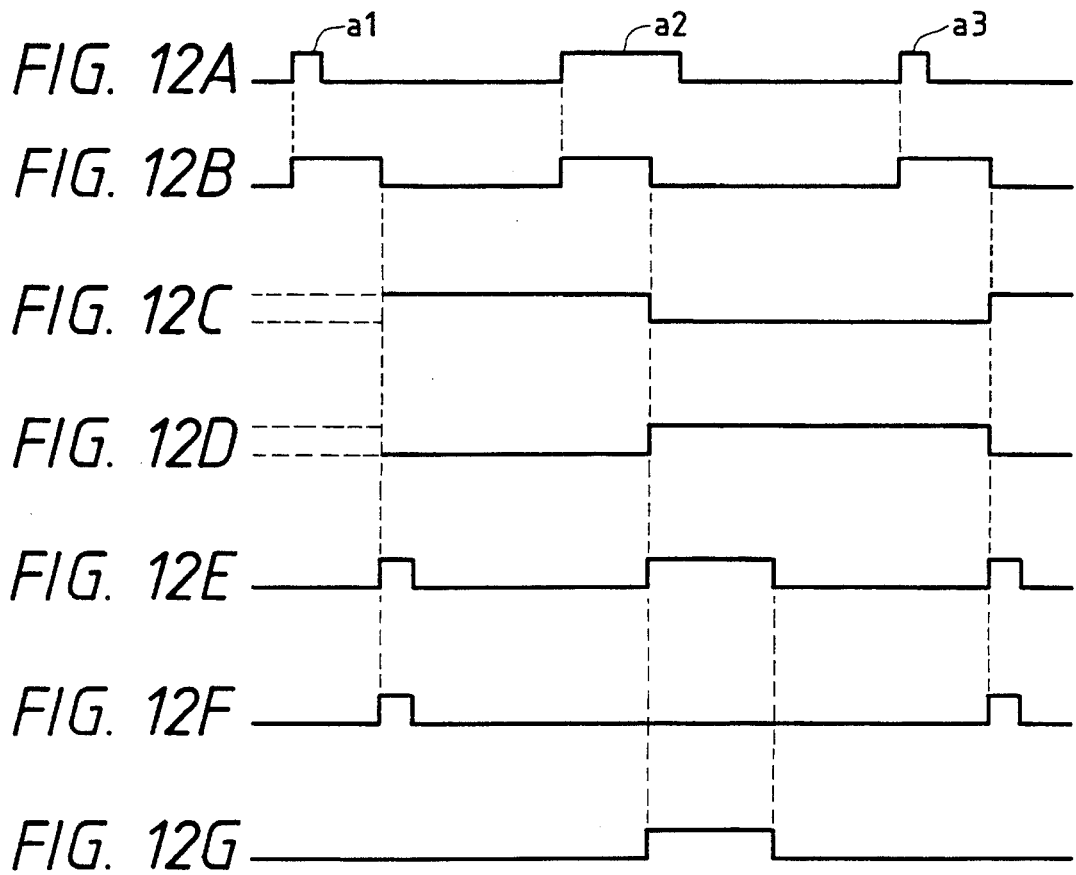
FIG. 12A
FIG. 12B
FIG. 12C
FIG. 12D
FIG. 12E
FIG. 12F
FIG. 12G

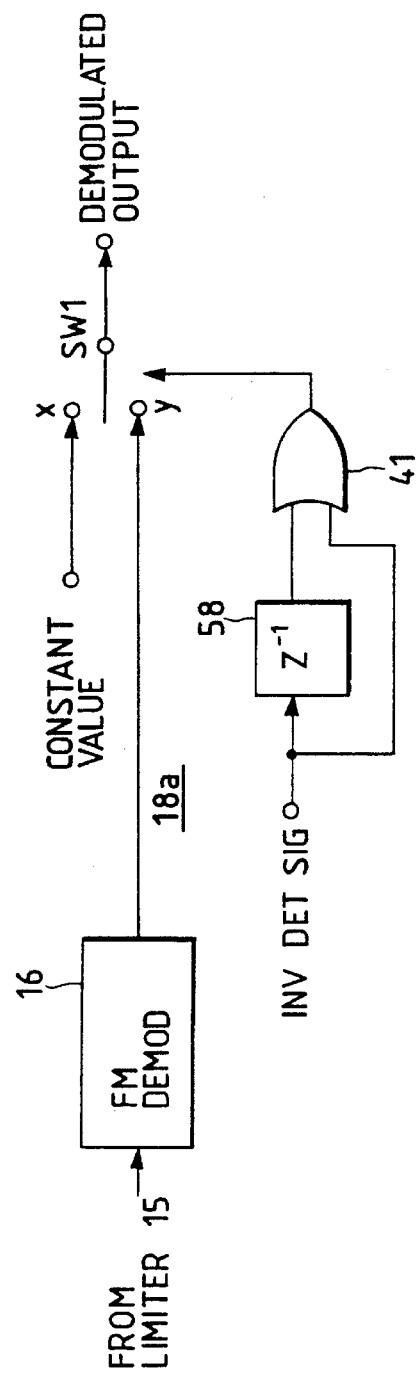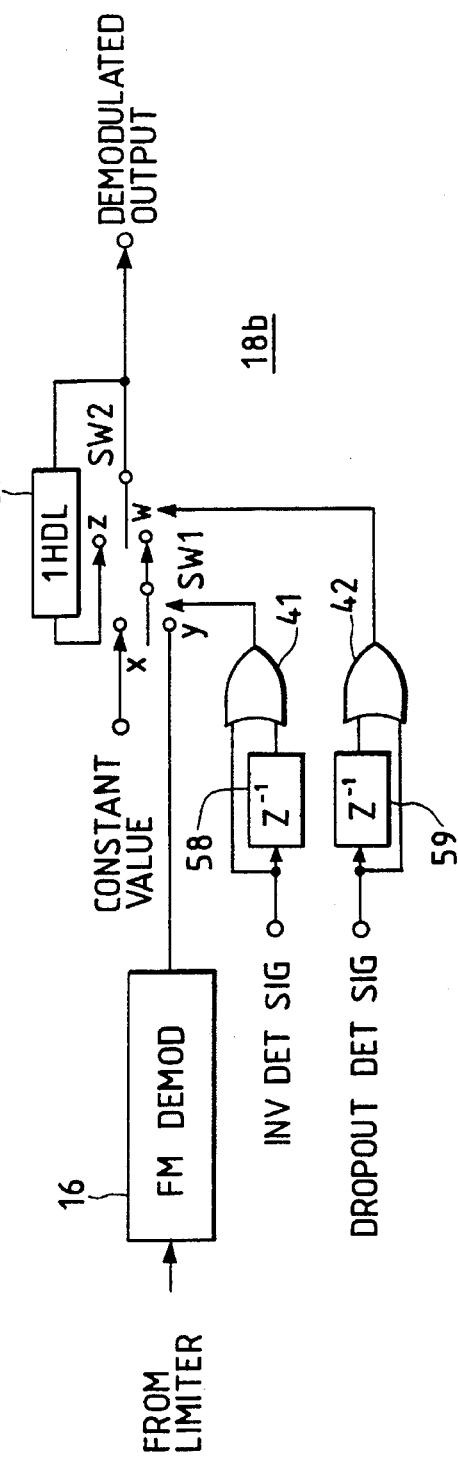

FREQUENCY DEMODULATING APPARATUS WITH INVERSION COMPENSATION

This application is a continuation of application Ser. No. 07/899,982 filed Jun. 17, 1992, now abandoned.

BACKGROUND OF THE INVENTION

1. Field of the Invention

This invention relates to an information reproduction apparatus, in particular this invention relates to an information reproduction apparatus for reproducing an FM signal by FM demodulating with detection of an inversion phenomenon developed in FM demodulation processing and with compensation of the demodulated FM signal distorted due to the inversion phenomenon, the FM signal being supplied from a VTR such as S-VHS ("S-VHS" is a trademark for VTR) and the like or from a transmission system for transmitting a video signal FM-modulated.

2. Description of the Prior Art

All information reproduction apparatus is known which comprises an FM demodulator and a deemphasis circuit. In a video tape recorder (VTR) for general home use as a typical information reproducing apparatus, an FM modulator is provided in a luminance signal processing circuit for recording. On the other hand, an FM demodulator is used in the luminance signal processing circuit for reproduction. There is a problem of an inversion phenomenon (problem) which should be taken care for the FM demodulation of the VTR. The higher the frequency of the video signal, or the more the recording current increases, or the higher the frequency of a carrier (carrier), the more unique characteristics it shows, which characteristics are not found in the general signal transmission lines. Thus, this causes an amplitude-frequency characteristic to deteriorate or the inversion problem, so that distortion is generated.

FIGS. 3A to 3E show waveforms for explaining the inversion phenomenon in the prior art. The inversion phenomenon is as follows:

When there is a glitter portion on the reproduced image from the VTR, an edge of such portion on the reproduced image seems broken.

If there is unbalance between upper and lower side band waves of the reproduced FM signal, and when luminance represented by the video signal changes from black to white, the waveform of the FM signal distorted at a steep rising portion thereof such that a half cycle of a portion of the waveform does not cross the zero level but swings as shown in FIG. 3C. If this distorted signal is applied to a limiter as it is, the FM signal is equivalently demodulated such that in its waveform, the luminance does not rise toward the white level but falls to the black level because the zero-cross point having information is lacked. Thus, this is referred to as "inversion phenomenon" or "inversion problem". In particular, if the video emphasis is effected, this phenomenon occurs very often because a spike is developed after a rising portion of a waveform of a video signal. FIGS. 3A to 3E show this phenomenon. FIG. 3A shows an FM signal representative of an edge portion where a spike is developed by the video emphasis. FIG. 3B shows a waveform of an FM signal representative of that edge portion. FIG. 3C shows a waveform of a reproduced FM signal representative of the edge portion. FIG. 3E shows a waveform of an output of an FM demodulator representative of the edge portion where the inversion phenomenon occurs.

The inversion phenomenon results in limitation of a frequency shift amount $\Delta f$ and a video emphasis amount. Thus, various countermeasures against the inversion phenomenon have been tried in the recent home use VTRs in order to prevent the inversion phenomenon even if the video emphasis amount is increased. For example, the inversion phenomenon is prevented as follows:

A reproduced FM signal is applied to a circuit for suppressing its low frequency components and for emphasizing its high frequency components because this makes a level of the carrier smaller than a level of the Lower sideband to prevent the zero-cross error shown in FIG. 3C. However, an SN ratio of the demodulated signal will decrease because lower sideband components having a higher SN ratio are suppressed. Then, an anti-inversion circuit has been adopted which operates the low frequency suppression circuit only in the condition that the inversion may occur, that is, it effects the low frequency suppression circuit when decrease in the level of the carrier is detected.

However, such circuits do not sufficiently prevent or compensate the inversion phenomenon. This is because these circuits mentioned above detect only decrease in the level of the carrier to prevent the inversion problem, so that these circuits also detect decrease in the level of the FM signal due to dropout, etc. Moreover, it is uncertain that the inversion always occurs when the level of the FM signal decreases. Further, there is also a problem that the compensation for the inversion problem was not sufficient. In particular, there is the problem of the inversion phenomenon in the compatibility-reproducing or in the long time reproducing mode because the picture quality decreases considerably.

SUMMARY OF THE INVENTION

The present invention has been developed in order to remove the above-described drawbacks inherent to the conventional information reproduction apparatus.

According to the present invention there is provided a first information reproduction apparatus for reproducing a frequency modulated signal, the information reproduction apparatus having a demodulation portion for demodulating the frequency modulated signal and a deemphasis portion for deemphasis the demodulated frequency modulated signal, comprising: a detection portion for detecting an inversion of levels of the demodulated frequency demodulated signal to produce an inversion detection signal, the inversion being such that the frequency demodulated signal is uncorresponding to the frequency modulated signal when the frequency modulated signal having an image of an edge portion; a compensation portion responsive to the inversion detection signal for compensate the demodulated frequency modulated signal, the compensated demodulated frequency modulated signal being supplied to the deemphasis portion.

According to the present invention there is also provided a second information reproduction apparatus for reproducing a frequency modulated signal as mentioned in the first information reproduction apparatus, wherein the detection portion comprises a first comparing portion for comparing a magnitude of the demodulated frequency modulated signal with a first predetermined magnitude and a second comparing portion for comparing the magnitude of the demodulated frequency modulated signal with a second predetermined magnitude, the first and second predetermined level being different from each other, the detection portion produces the inversion detection portion when the magnitude is larger than the first predetermined magnitude and is less than the second predetermined magnitude.

According to the present invention there is further provided a third information reproduction apparatus for reproducing a frequency modulated signal as mentioned in the second information reproduction apparatus, wherein the detection portion further comprises a delay portion for delaying the demodulated frequency modulated signal a predetermined interval and third comparing portion for comparing the delayed demodulated frequency modulated signal with a third predetermined magnitude substantially corresponding to magnitude of said demodulated frequency modulated signal indicative of a black tone, the detection portion producing the inversion detection signal in accordance with an output of the third comparing portion.

According to the present invention there is also provided a fourth information reproduction apparatus for reproducing a frequency modulated signal as mentioned in the first information reproduction apparatus, further comprising a dropout detection portion responsive to the demodulated frequency modulated signal and the inversion detection portion for detecting dropout of the demodulated frequency modulated signal to produce a dropout detection signal in the presence of the inversion detection signal and a dropout compensation portion responsive to the dropout detection signal for compensating the demodulated frequency modulated signal.

BRIEF DESCRIPTION OF THE DRAWINGS

The object and features of the present invention will become more readily apparent from the following detailed description taken in conjunction with the accompanying drawings in which:

FIG. 11 is a block diagram of the timer circuit shown in FIG. 10;

FIGS. 12A to 12G are explanatory drawings showing waveforms for explaining operation of the timer circuit shown in FIG. 10 of this invention;

FIG. 16 is a block diagram of the inversion compensation circuit of an embodiment of this invention; and FIG. 17 is a block diagram of another embodiment of the inversion compensation circuit of the invention.

The same or corresponding elements or parts are designated as like references throughout the drawings.

DETAILED DESCRIPTION OF THE INVENTION

Prior to describing of embodiments of this invention, a principle of detecting the inversion phenomenon will be described.

Figure 4:
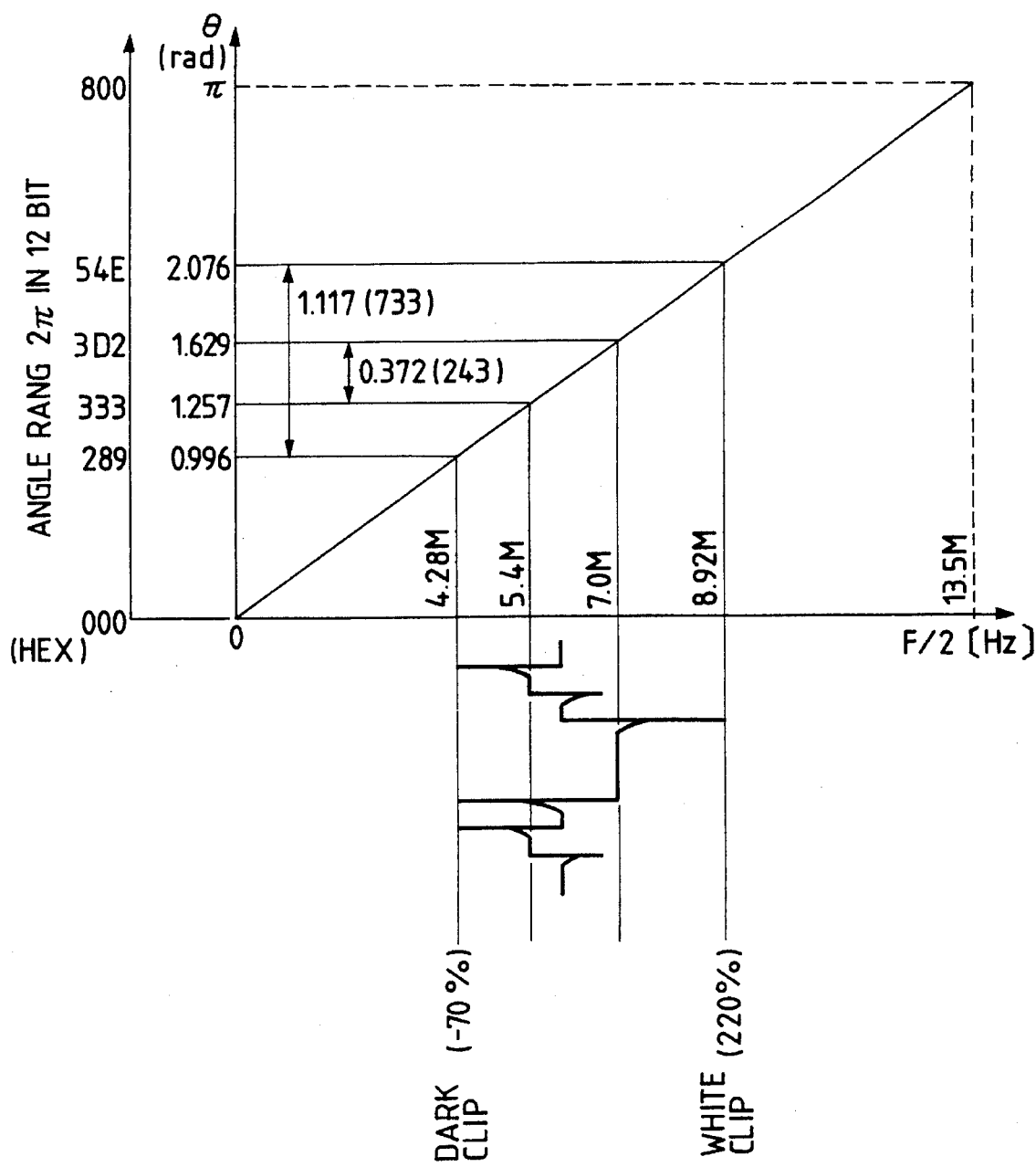
FIG. 4 shows a relation between FM allocation and instantaneous phase rotation amount of this invention.

When FM demodulation of the VTR by digital signal processing, more specifically, $\tan^{-1}$ type FM demodulation is performed, there is a relation:

$$\theta = 2\pi f/F \quad (1)$$

where F is a sampling frequency of the FM signal, f is a carrier frequency of the FM signal, and $\theta$ is a phase difference per one sampling clock period. A relation between FM allocation, sampling frequency F, and phase difference $\theta$ of the actual VTR is shown in FIG. 4 using this relation. That is, FIG. 4 shows a relation between FM allocation and instantaneous phase rotation amount in the case of a VTR of S-VHS (trademark) when F=27 MHz. Assuming that a carrier frequency of white clip is $f_{WCLP}$ and a carrier frequency of dark clip is $f_{DCLP}$, a phase difference $\theta_\square$ when the inversion does not occur satisfies the following inequality:

$$2\pi f_{DCLP}/F \leq \theta_\square \leq 2\pi f_{WCLP}/F \quad (2)$$

Figure 3A:
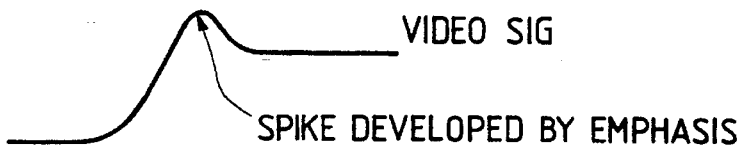
FIGS. 3A to 3E show waveforms for explaining a problem in the prior art.
Figure 3B:
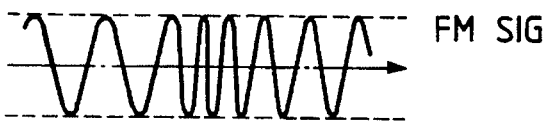
Figure 3C:
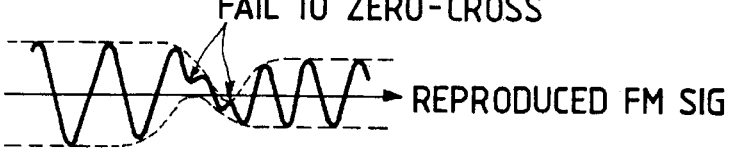
Figure 3D:
Figure 3E:
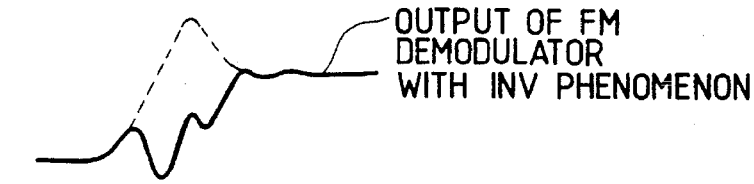

Therefore, in the case of a black inversion which is one inversion phenomenon frequently seen on the reproduced image as a black stripe developed at a portion where the video signal rises rapidly from a black level to a white level, $\theta_\square$ is lower than $2\pi f_{DCLP}/F$. On the other hand, a white inversion which is the other inversion seen as a white stripe developed at a portion where the video signal Falls rapidly from a white level to a black level, $\theta_\square$ exceeds $2\pi f_{WCLP}/F$. This is because the FM signal does not cross the zero level as shown in FIG. 3C, so that for an analog type FM demodulator using a limiter, this is equivalent to the case that a low frequency signal is inputted. Further, in the digital signal processing, operation errors become larger because a phase of an output signal of a Hilbert filter deviates from 90° instantaneously due to deformation of the FM signal. On the other hand, the white inversion is developed by phase deformation or wave deformation in an RF equalizer. Therefore, the inversion phenomenon can be detected by detecting whether or not the output of the FM demodulator satisfies the EQ. 2 by comparison with $2\pi f_{DCLP}/F$ and with $2\pi f_{WCLP}/F$ using magnitude comparators.

Figure 1:
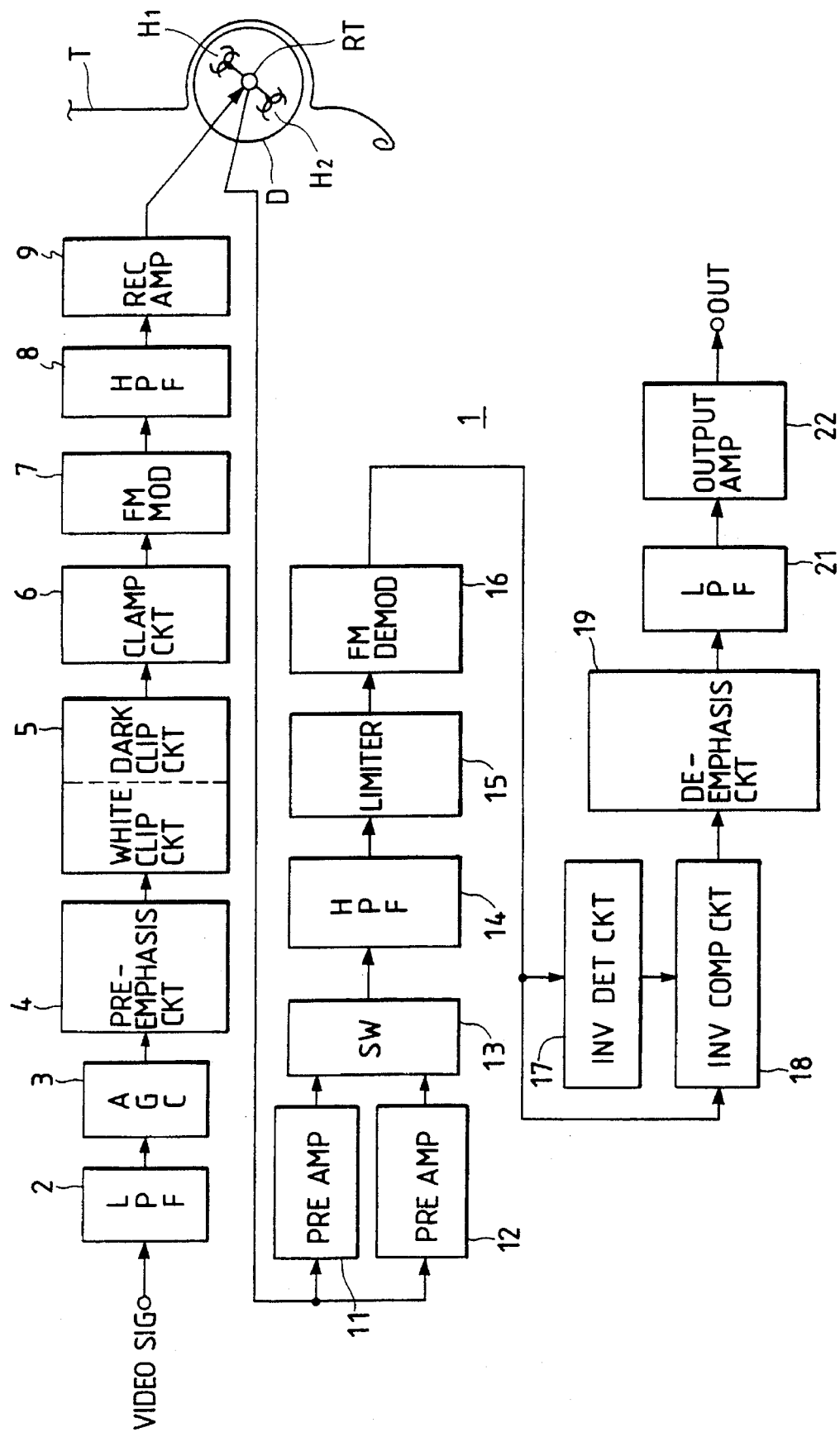
FIG. 1 is a system block diagram of the information reproducing apparatus of the invention.
Figure 2:
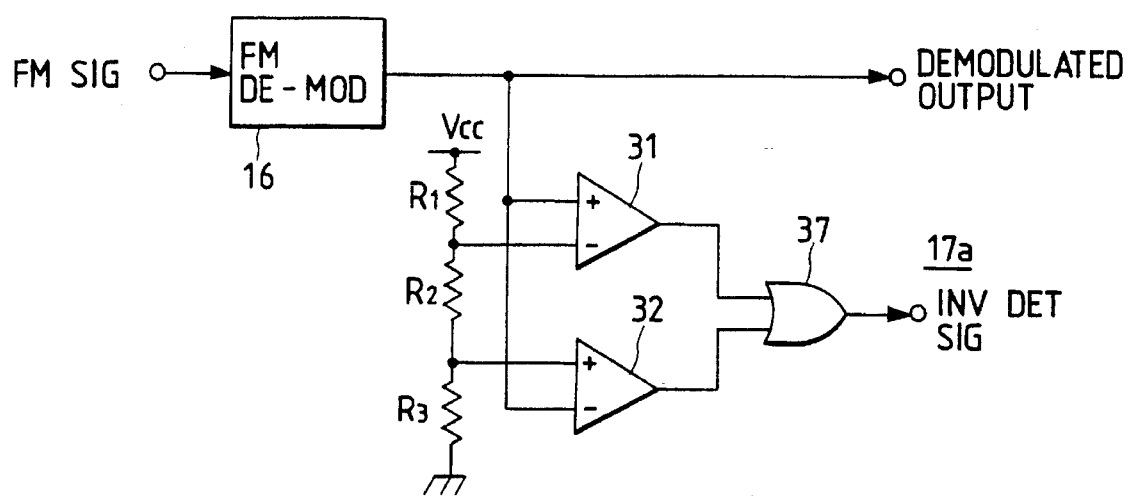
FIG. 2 is a block diagram of the inversion detection circuit of the first embodiment of an inversion detection circuit and the FM demodulating circuit shown in FIG. 1.

Hereinbelow will be described a first embodiment of this invention of an information reproducing apparatus with reference to FIGS. 1 and 2. FIG. 1 is a system block diagram of the information reproducing apparatus of the invention. In FIG. 1, a structure for recording, that is, a low-pass filter (LPF) 2, an AGC (automatic gain control circuit) 3, a preemphasis circuit 4, a clip circuit 5, a clamp circuit 6, an FM modulator 7, a HPF (high-pass filter) 8, and a recording amplifier (amplifier) 11 are shown. However, those are shown for convenience to describe application of the invention to an ordinary VTR. In fact, the information reproducing apparatus comprises reproducing preamplifiers 11 and 12, a switch circuit 13, a high-pass filter (HPF) 14, a limiter 15, an FM demodulator 16, an inversion detection circuit 17, an inversion compensation circuit 18, a deemphasis circuit 19, a low-pass filter (LPF) 21, and an output amplifier 22.

In FIG. 1, a pair of video heads $H_1$ and $H_2$ provided to a rotary drum D with which a magnetic tape T is contacted are used for both recording and reproducing. A rotary transformer RT are also used for both recording and reproducing. The inversion detection circuit 17 and the inversion compensation circuit 18 are newly added to the conventional information reproduction apparatus.

Hereinbelow will be described a structure of the inversion detection circuit 17 and the inversion compensation circuit 18 with reference to FIG. 2. At first, the inversion detection circuit will be described. FIG. 2 is a block diagram of the inversion detection circuit 17a of the first embodiment and the FM demodulating circuit 16, these circuits employing the analog signal processing. That is, the FM demodulator 16 has a structure for dealing with an analog FM signal. In FIG. 2, numerals 31 and 32 are comparators and numeral 37 is an OR gate. Dividing of a supply voltage Vcc by suitably selected resistances of resistors $R_1$ to $R_3$ provides a voltage corresponding to $2\pi f_{WCLP}/F$ which is applied to an inverting input of the comparator 31 and a voltage corresponding to $2\pi f_{DCLP}/F$ which is applied to a non-inverting input terminal of the comparator 32. These comparator circuits provide an inversion detection output from the OR gate 37 when an output level of the FM demodulator 16 lies in ranges other than the range between the both voltages mentioned above.

Figure 5:
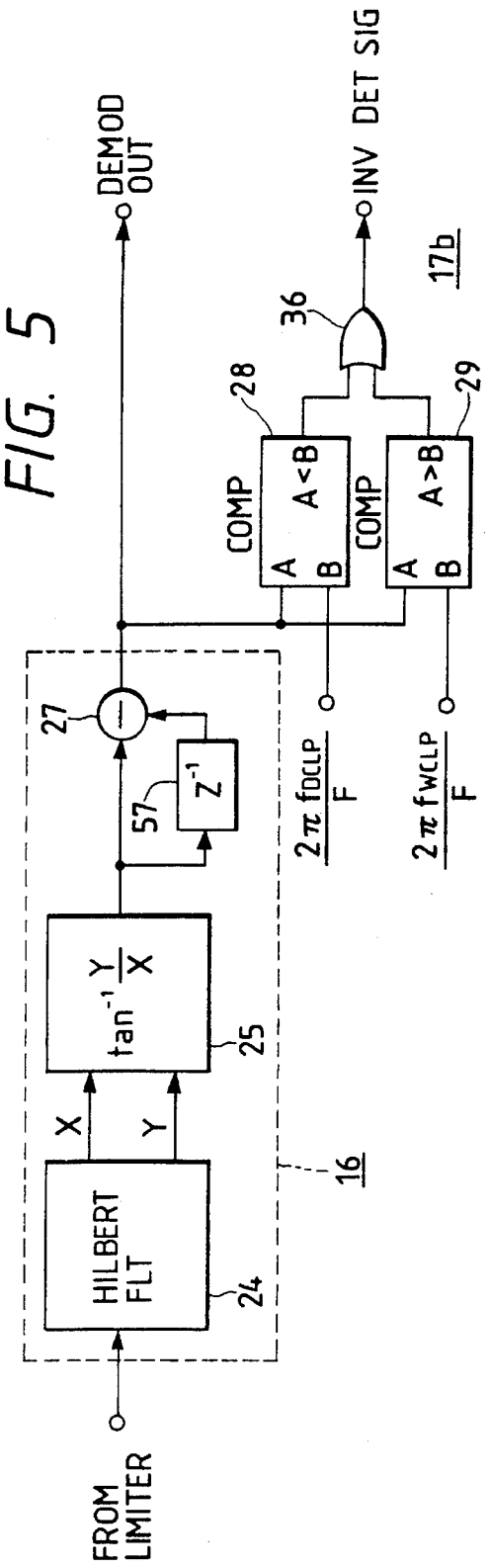
FIG. 5 is a block diagram of the second embodiment of this invention of an inversion detection circuit and the FM demodulating circuit shown in FIG. 1.

Hereinbelow will be described a second embodiment of this invention with reference to FIG. 5. FIG. 5 is a block diagram of the second embodiment of this invention of an inversion detection circuit 17b and the FM demodulation circuit 16, these circuits employing digital signal processing. As shown in FIG. 5, the FM demodulator 16 for effecting $\tan^{-1}$ type demodulation, comprises a Hilbert filter 24, a $\tan^{-1}$ (Y/X) operator 25, a one-clock delay circuit 57, and a subtractor 27. The FM demodulator 16 executes the conventional FM demodulation operation through a digital processing. The inversion detection circuit 17b for effecting comparison and detection operation through a digital processing is basically similar in principle to the inversion detection circuit 17a for the analog signal mentioned above. If the $\tan^{-1}$ output of the FM demodulator 16 outputs phase values of 12 bit range (000H to FFFH) assigned to phase values 0 to $2\pi$, $2\pi f_{DCLP}/F$ corresponds to 271 H and $2\pi f_{WCLP}/F$ corresponds to 54 EH. In actual, it is preferable that the range where inversion is judged to be absent is set to be wider than the theoretical value in consideration with noise affection.

Figure 6:
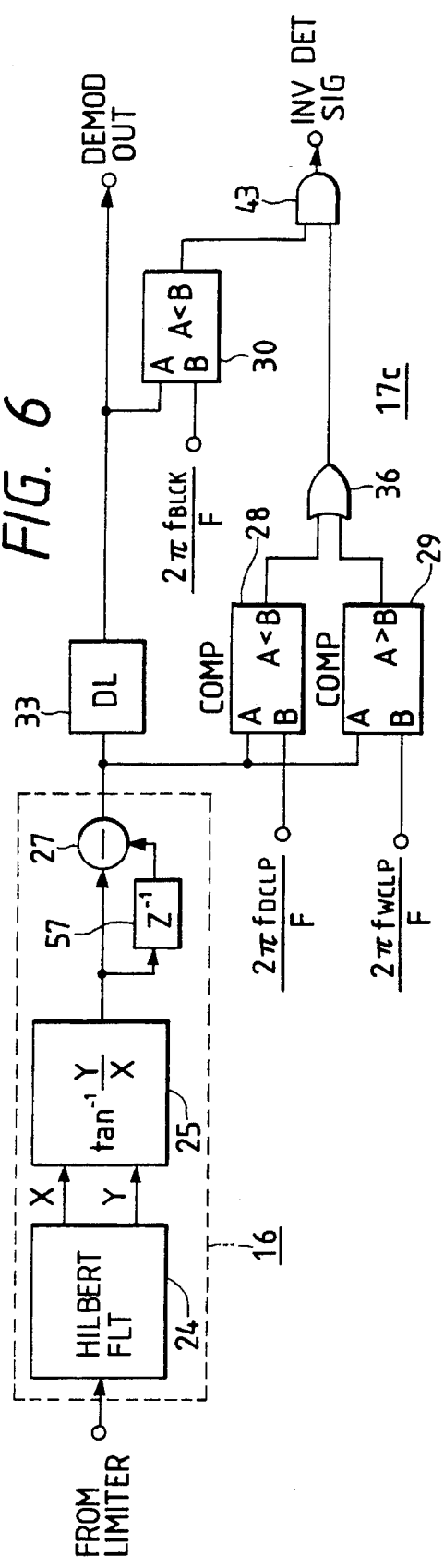
FIG. 6 is a block diagram of the third embodiment of this invention of an inversion detection circuit and the FM demodulating circuit shown in FIG. 1.

Hereinbelow will be described a third embodiment of this invention with reference to FIG. 6. FIG. 6 is a block diagram of the third embodiment of this invention of an inversion detection circuit 17c and the FM demodulation circuit 16, these circuits employing digital signal processing.

The inversion phenomenon occurs frequently at the portion where the level of the video signal rises from a black level to a white level rapidly. Therefore, the demodulated video signal just before the detection of the inversion is considered to be a level near the black level. Thus, detection of this can increase the accuracy of the inversion detection. That is, this is detected by comparing the magnitude of the demodulated FM signal whose time base is slightly prior to that of the demodulated FM signal applied to the comparators 28 and 29. FIG. 6 shows the third embodiment of an inversion detection circuit 17c of digital signal processing which has such function. In FIG. 6, numeral 33 is a delay circuit for adjusting timing, numeral 30 is a comparator, and numeral 43 is an AND gate, other elements corresponding to those shown in FIG. 5 mentioned above are designated with the same references and thus, the detailed description is omitted. A level of the reference signal $2\pi f_{BLACK}/F$ applied to a B input terminal of the comparator corresponds to magnitude of the output of the FM demodulator 16 at the time when an approximate black level is demodulated. The inversion detection signal is outputted from the AND gate 43 when comparators 28 and 29 detect that the magnitude of the output of the FM demodulator 16 lies in ranges other than the range between the two voltages $2\pi f_{DCLP}/F$ and $2\pi f_{WCLP}/F$ and the comparator 30 detects the output of the delay circuit 33 is smaller than the reference signal $2\pi f_{BLACK}/F$.

Figure 7:
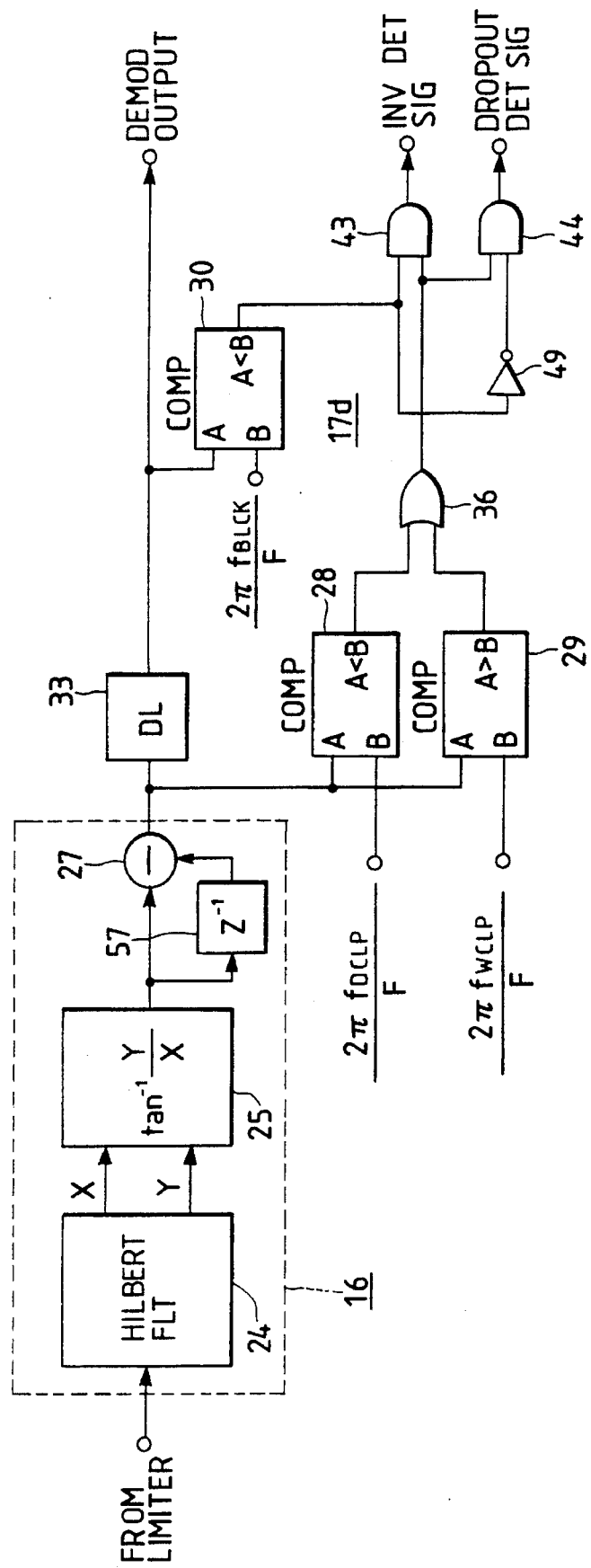
FIG. 7 is a block diagram of the fourth embodiment of an inversion detection circuit and the FM demodulating circuit shown in FIG. 1.

Hereinbelow will be described a fourth embodiment of this invention with reference to FIG. 7. FIG. 7 is a block diagram of the fourth embodiment of this invention of an inversion detection circuit 17d and the FM demodulation circuit 16, these circuits employing digital signal processing.

When the inversion phenomenon is detected by the inversion detection circuit 17b of the second embodiment, the magnitude of the demodulated FM signal just before the detection of the inversion may be higher than the black level. That case is considered as not the inversion phenomenon but dropout. Then, it is convenient that a dropout detection signal is outputted in such case. The inversion detection circuit 17d of the fourth embodiment provides both these detection signals. It comprises an inverter 49 for inverting the output of the comparator 30 and an AND gate 44 for effecting logical product operation between the outputs of the inverter 49 and the OR gate 36 in addition to the inversion detection circuit 17c of the third embodiment. In FIG. 7, the same elements as to those of FIGS. 5 and 6 mentioned above are designated with the same reference and thus, the detailed description of operation of these elements is omitted.

Figure 8:
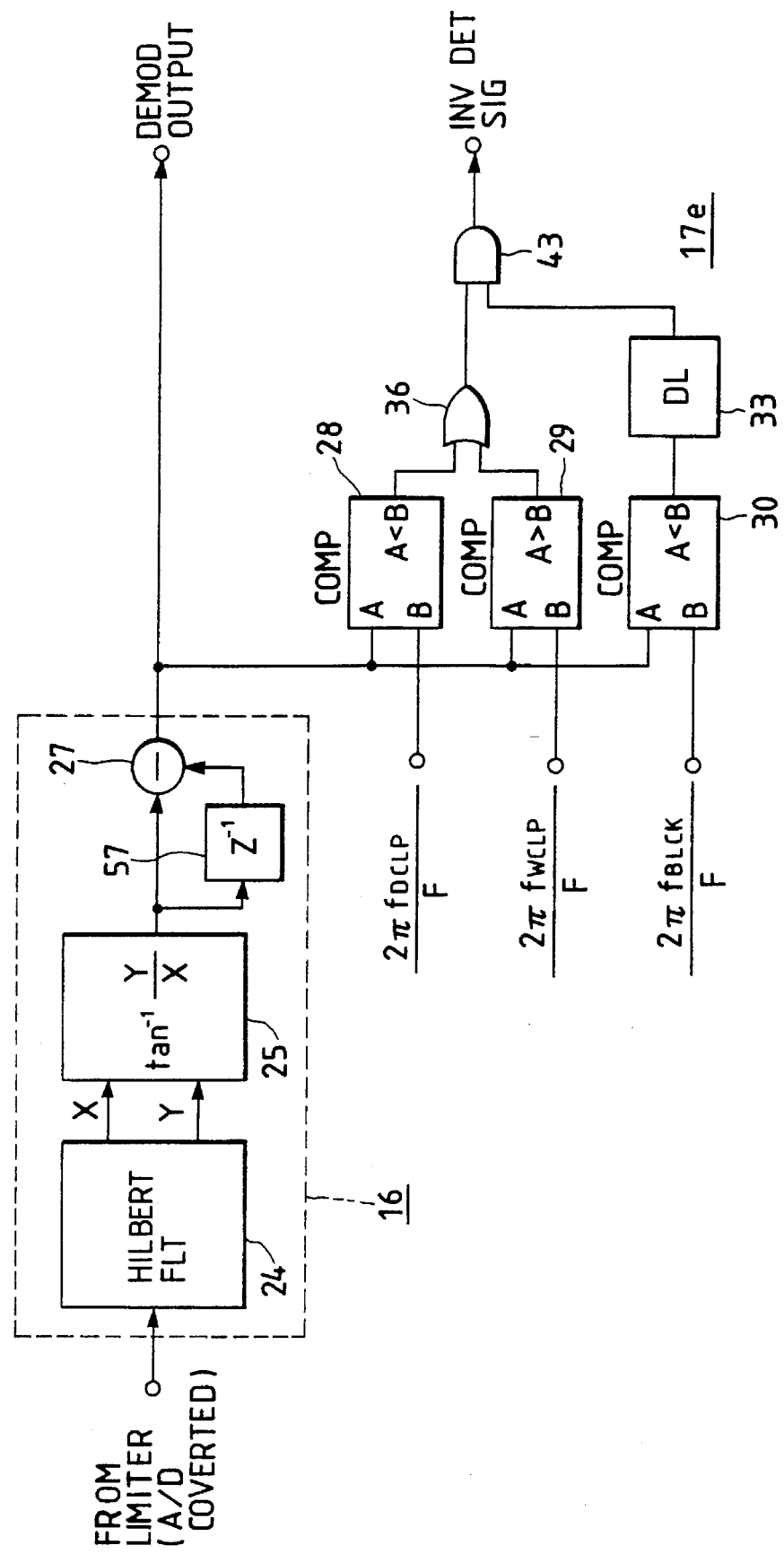
FIG. 8 is a block diagram of the fifth embodiment of an inversion detection circuit and the FM demodulating circuit shown in FIG. 1.
Figure 9:
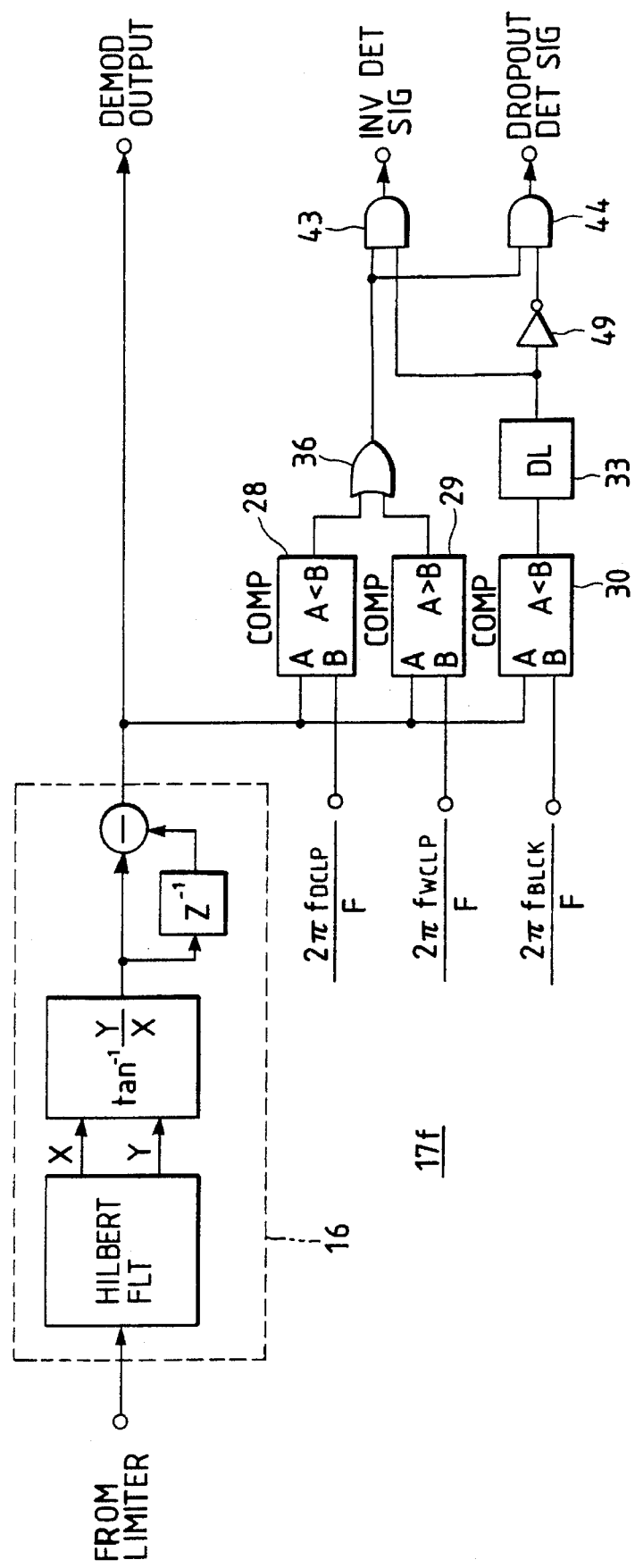
FIG. 9 is a block diagram of the sixth embodiment of an inversion detection circuit and the FM demodulating circuit shown in FIG. 1.

Hereinbelow will be described fifth and sixth embodiments of this invention with reference to FIGS. 8 and 9. FIG. 8 is a block diagram of the fifth embodiment of this invention of an inversion detection circuit 17e and the FM demodulation circuit 16, these circuits employing digital signal processing. FIG. 9 is a block diagram of the sixth embodiment of this invention of an inversion detection circuit 17f and the FM demodulation circuit 16.

In the inversion detection circuits 17c and 17d of the third and fourth embodiments shown in FIGS. 6 and 7 respectively, the present magnitude of the demodulated FM signal is compared with the magnitude of the demodulated FM signal just prior to the present by delaying the output of the FM demodulator 16. While, delaying of the comparison result of the video signal will provide the same result. The fifth and sixth embodiments shown in FIGS. 8 and 9 realize this. That is, the comparator 30 is directly connected to the output of the FM demodulator 16; the output of the comparator 30 is delayed by the delay circuit 33; and the output of delay circuit 33 is sent to the AND gates 43 and 44. These inversion detection circuits 17e and 17f of the fifth and sixth embodiments correspond to the inversion detection circuits 17c and 17d of the third and fourth embodiments respectively, that is, the inversion detection circuits without dropout detection function and with dropout detection function.

Figure 10:
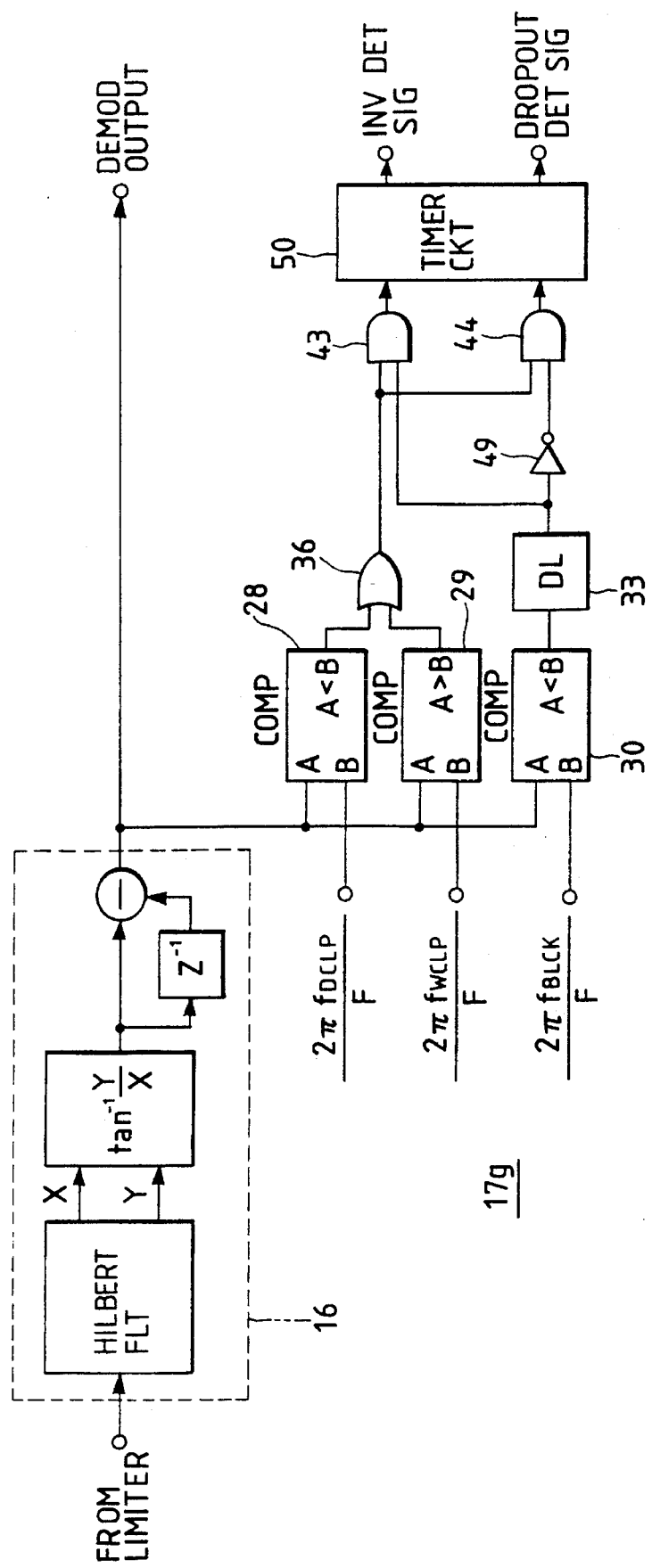
FIG. 10 is a block diagram of the seventh embodiment of an inversion detection circuit and the FM demodulation circuit 16.

Hereinbelow will be described a seventh embodiment of this invention with reference to FIG. 10. FIG. 10 is a block diagram of the seventh embodiment of this invention of an inversion detection circuit 17g and the FM demodulation circuit 16, these circuits employing digital signal processing.

As shown in FIG. 3C, the number of waves of the FM signal which do not cross the zero level when the inversion occurs is usually one or two. That is, this does not continue over several waves of the FM signal. Therefore, if this is detected over an interval of one or two waves of the FM signal, the possibility of dropout is supposed to be high. Then, a timer circuit 50 is provided as shown in FIG. 10. When the inversion detection signal is outputted from the AND gate 43 over a predetermined interval, a judgment of occurrence of dropout is made. This provides further superior detection of the dropout. FIG. 11 is a block diagram of the timer circuit 50 for example. The timer circuit 50 comprises: a delay circuit 34 for delaying the output of the AND gate 43; a monostable multivibrator (MM) 55 responsive to the output of the AND gate 43; a flip-flop circuit 51 whose D input responds the output of the AND gate 43 and whose clock input responds an output of the multivibrator 55; an AND gate 47 for AND operation between the output of the delay circuit 34 and a $\overline{Q}$ output of the flip-flop 51; an AND gate 48 for AND operation between the output of the delay circuit 34 and a Q output of the flip-flop 51, and an OR gate 38 for OR operation between an output of the AND gate 48 and an output of the AND gate 44.

Operation of the timer circuit 50 will be described with FIGS. 12A to 12G showing waveforms at respective portions a to g shown in FIG. 11. It is assumed that the AND gate 43 outputs a signal whose waveform shown in FIG. 12A. That is, a pulse a2 of the signal has a longer duration of time than pulses a1 and a3 and also than the predetermined interval of the timer circuit 50 as shown in FIGS. 12A and 12B. The monostable multivibrator 55 outputs a logic H (high) at a timing of rising edge of the inversion detection signal and outputs a logic L (low) when the predetermined interval has passed as shown in FIG. 12B. That is, after a time duration of the pulses a1 and a3 the monostable multivibrator 55 outputs logic L. The delay circuit 34 delays the output of the AND gate 43 by the interval corresponding to the time duration of H at the monostable multivibrator 55 as shown in FIG. 12E. The flip-flop circuit 51 changes its outputs Q and $\overline{Q}$ at a falling edge of the output of the monostable multivibrator 55 in accordance with a level of its data input D as shown in FIGS. 12C and 12D. Thus, logic OR operations are effected between the output of the delay circuit 34 and the $\overline{Q}$ output of the flip flop 51 by the AND gate 47 as shown in FIG. 12F and between the Q output and the output of the delay circuit 34 of the flip flop 51 by the AND gates 48. Thus, the AND gates 47 and 48 output the inversion detection signal and the dropout detection signal separately as shown in FIGS. 12F and 12G respectively. The OR gate 38 is provided to combine the output of the AND gate 48 with the output of the AND gate 44.

Figure 13:
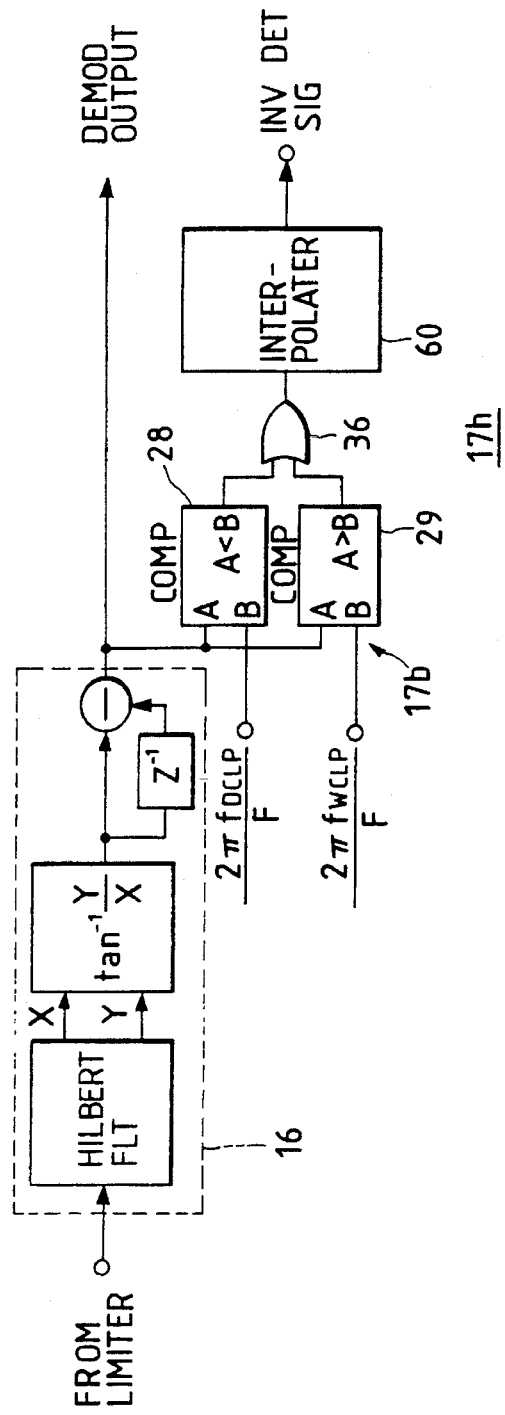
FIG. 13 is a block diagram of the eighth embodiment of an inversion detection circuit and the FM demodulation circuit 16.

Hereinbelow will be described an eighth embodiment of this invention with reference to FIG. 13. FIG. 13 is a block diagram of the eighth embodiment of this invention of an inversion detection circuit 17h and the FM demodulation circuit 16, these circuits employing digital signal processing.

There is a possibility that the inversion detection signal is not outputted though the inversion should be detected because when the inversion occurs, the magnitude of the FM signal often becomes lower, so that the operation in the FM demodulator 16 becomes inaccurate. Thus, when the inversion is detected again after once it was detected, it is desired to interpolate both detection signals. The inversion detection circuit 17h has an interpolation circuit 60 for effecting such interpolation provided to an output stage of the inversion detection circuit 17b mentioned above. This interpolation circuit 60 comprises, for example, as shown in FIG. 14, three flip-flop circuits 52 to 54, AND gates 45 and 46, and OR gates 39 and 40 which are connected as shown.

Figure 14:
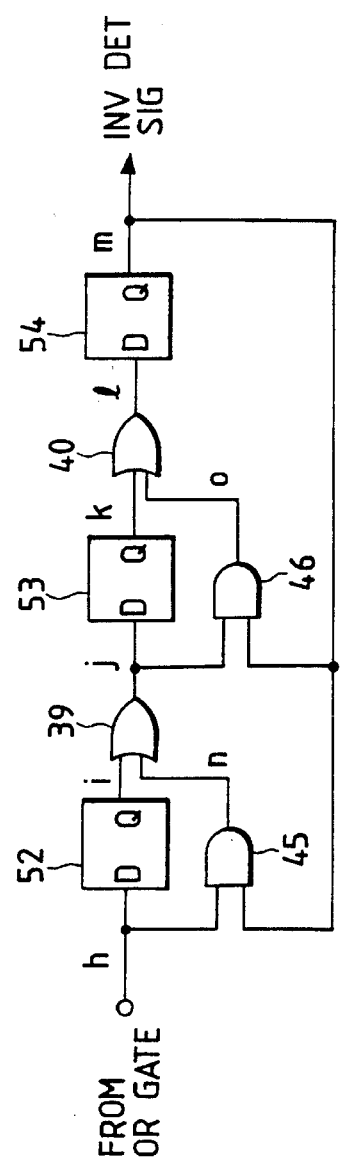
FIG. 14 is a block diagram of an interpolater of this invention shown in FIG. 13.
Figures 15D, 15E, 15F:
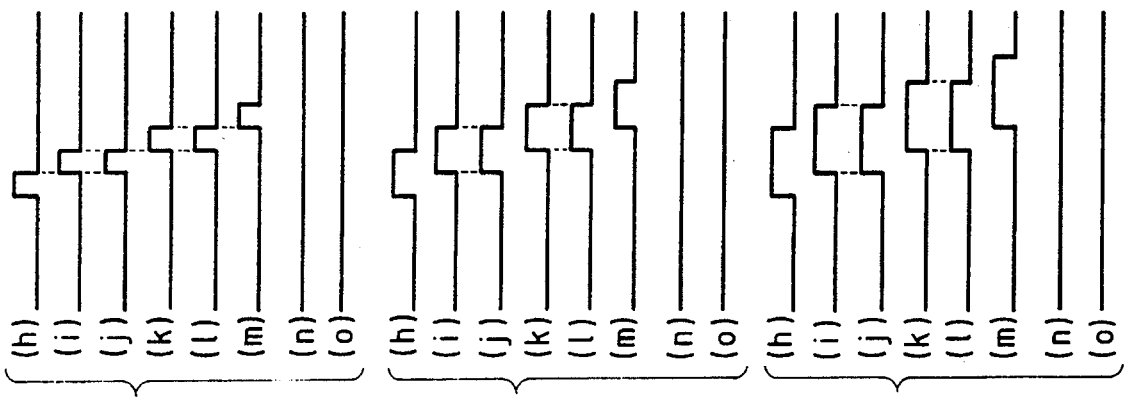
FIGS. 15A to 15F shows waveforms of signals at respective portions shown in FIG. 14.
Figures 15A, 15B, 15C:
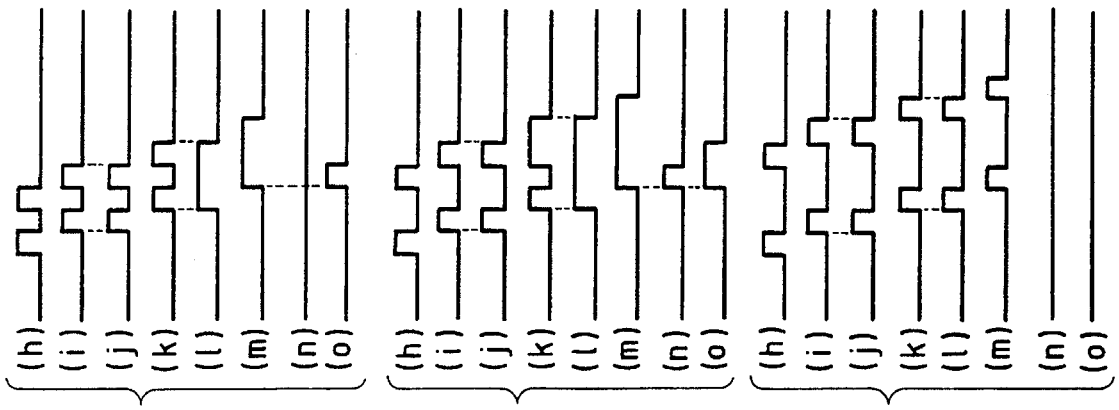

Waveforms at respective portions h to o shown in FIG. 14 are shown in FIGS. 15A to 15F at respective clock timings. Because the operation of the interpolation circuit 60 will be understood by referring to FIG. 14 and FIGS. 15A to 15F, its detailed description is omitted. That is, the flip-flop circuits 51 to 54 delay the detection signal by one clock interval. This structure has the function that when there is dropout of the detection signal during two clock signals in the interpolation circuit 60, it interpolates the dropout.

Then, will be described structure and operation of the inversion compensation circuit 18 of the information reproduction apparatus 1 of the invention with reference to FIG. 16. FIG. 16 is a block diagram of the inversion compensation circuit 18a which can be used with any one of the inversion detection circuits 17a to 17h. As mentioned above, the inversion occurs because the FM signal does not cross the zero level. However, this occurs instantaneously, that is, only during one to two waves interval of the FM signal. The inversion is seen on the display such that a trace extends to the right from an edge portion, which is caused by adverse affection of the deemphasis circuit 19 of the following stage. Thus, when the inversion phenomenon is detected by the inversion detection circuit 17 (17a to 17h), the FM signal indicating a white clip level or approximately the same level must be demodulated. Therefore, the inversion must be unobtrusive if switching is made from the output of the FM demodulator 16 to a voltage which is the same as the white clip level or a value obtained by A/D conversion of this voltage in the prior stage to the FM demodulation.

In FIG. 16, numeral 58 is a one-clock delay circuit, numeral 41 is an OR gate, reference SW1 is a switch. A constant value applied to a terminal x of the switch SW1 is set to a value or a voltage obtained when the FM signal would be demodulated which indicates the white clip level or an approximate value. A terminal y of the switch SW1 is supplied with a video signal demodulated from the FM demodulator 16. The inversion detection signal is supplied from the output terminal of one of the inversion detection circuits 17b, 17c, 17e, or 17h.

If the inversion detection circuit 17c is used, the delay circuit 33 is interposed between the FM demodulator 16 and the terminal y of the switch SW1. The one-clock delay circuit 58 and the OR gate 41 are used to compensate data during two clock periods though the inversion is detected during one-clock period because the FM demodulator 16 obtains a difference of the output values of the $\tan^{-1}$ before and after one clock. Thus, the switch SW1 contacts with the terminal x when the output of the OR gate 41 is H.

At last, will be described structure and operation of another embodiment of the inversion compensation circuit 18b with reference to FIG. 17. FIG. 17 is a block diagram of another embodiment of the inversion compensation circuit 18a of the invention. In FIG. 17, a circuit including a delay line 35 for delaying a signal thereinto 1 H (one horizontal scanning period) and a switch SW2 is added to the inversion compensation circuit 18a. A contact w of the switch SW2 is supplied with the output of the switch SW2. Another contact z of the switch SW2 is supplied with an output of the delay line 35. A common of the switch SW2 is supplied to an input of the delay line 35 and a demodulated output is outputted therefrom. The switch SW2 is controlled by the dropout detection signal through a one-clock delay circuit 59 and an OR gate 42 which operate in the similar manner to the one-clock delay circuit 58 and the OR gate 41.

The inversion detection signal is applied to an input of the one-clock delay circuit 58 and to one input of the OR gate 41. The dropout detection signal is supplied to an input of the one-clock delay circuit 59 and to one input of the OR gate 42 from output terminals of the inversion detection circuit 17d, 17f, or 17g shown in FIGS. 7, 9, and 10. In the case of use of the inversion detection circuit 17d, the delay circuit 33 is interposed between the FM demodulator 16 and the switch SW1.

When the dropout is detected the OR gate 42 sends a control signal to the switch SW2 to cause it to connect its common to the terminal z in order to output a signal inputted thereinto 1 H before.

In description mentioned above, only information of the video signal or the like was handled. However, this invention is applicable to a voice signal and the like if FM modulation and demodulation are effected. Moreover, the inversion detection circuit 17 and inversion compensation circuit 18 are described, assuming that they are used for information reproduction apparatus. However, they are applicable to a video signal processing circuit and the like to which information is transmitted through a transmission line and the like.

The information reproduction apparatus of the invention is structured as mentioned above has various superior advantages as follows:

The inversion of the output of the FM demodulator can be detected more assuredly and the inversion can be made unobtrusive by appropriate compensation of the signal portion where the inversion occurs.

Appropriate compensation increases compatibility in the compatible reproduction and long time modes.

It is applicable to judgement whether or not tracking position in the auto-tracking function mode, is allowable. Also it is applicable to judgement whether or not automatic adjusting of an RF equalizer provided in the former stage than the FM demodulator. Therefore, deterioration in the picture quality can be reduced though a tracking accuracy is low, so that convenience in operation is increased.

The inversion detection circuit and the inversion compensation circuit are realized with a relatively simple circuits, so that these circuits can be reduced into an integrated circuit.

What is claimed is:

1. An information reproduction apparatus for reproducing a frequency modulated signal, said information reproduction apparatus having demodulation means for demodulating said frequency modulated signal and outputting a demodulated signal, and deemphasis means for deemphasis of the demodulated signal, comprising:

(a) detection means for detecting an inversion of levels of said demodulated signal to produce an inversion detection signal, said inversion being such that said demodulated signal fails to correspond to said frequency modulated signal when said frequency modulated signal represents an image of an edge portion, said detection means having:
  first comparing means for detecting whether or not a magnitude of said demodulated signal is larger than a first predetermined magnitude corresponding to a white clip level;
  second comparing means for detecting whether or not said magnitude of said demodulated signal is less than a second predetermined magnitude corresponding to a dark clip level;
  delay means for delaying said demodulated signal for a predetermined interval to provide a delayed demodulated signal;
  third comparing means for detecting whether or not a magnitude of said delayed demodulated signal is less than a third predetermined magnitude corresponding to a black tone, said third predetermined magnitude being different from said first and second predetermined magnitudes; and
  logic means for producing an inversion detection signal when said magnitude of said delayed demodulated signal is less than said third predetermined magnitude and when said magnitude of said demodulated signal is larger than said first predetermined magnitude corresponding to said white clip level or smaller than said second predetermined magnitude corresponding to said dark clip level; and (b) compensation means for compensating said demodulated signal, said compensation means having switch means responsive to said inversion detection signal for switchably outputting one of said demodulated signal or said first predetermined magnitude corresponding to said white clip level as a compensated demodulated signal, the compensated demodulated signal being supplied to said deemphasis means.

2. An information reproduction apparatus for reproducing a frequency modulated signal as claimed in claim 1, further comprising:
dropout detection means responsive to said first to third comparing means for detecting dropout of said demodulated signal and for producing a dropout detection signal when said magnitude of said delayed demodulated signal is not less than said second predetermined magnitude and when said magnitude of said demodulated signal is larger than said first predetermined magnitude or less than said second predetermined magnitude; and
dropout compensation means having a second delay means for delaying said demodulated signal for one horizontal scanning period and replacing means responsive to said dropout detection signal for replacing said demodulated signal with an output of said second delay means to compensate said demodulated signal.

3. An information reproduction apparatus for reproducing a frequency modulated signal as claimed in claim 1, wherein said detection means further comprises:
dropout detection means for detecting whether or not said inversion detection signal is successively detected over a predetermined interval and for providing an output signal indicative of successive detection of said inversion detection signal to said compensation means for causing said compensation means to compensate said demodulated signal.

4. An information reproduction apparatus for reproducing a frequency modulated signal as claimed in claim 1, further comprising:
second detection means for detecting whether or not said inversion detection signal is detected more than once in a predetermined time interval; and
interpolating means for producing an interpolated inversion detection signal when said inversion detection signal is detected more than once in said predetermined time interval, such that a level of said interpolated inversion detection signal is held for said predetermined time interval to cause said compensation means to compensate said demodulated frequency modulated signal.

5. An information reproduction apparatus for reproducing a frequency modulated signal as claimed in claim 2, further comprising:

second detection means for detecting whether or not said inversion detection signal is detected more than once in a predetermined time interval; and interpolating means for producing an interpolated inversion detection signal when said inversion detection signal is detected more than once in said predetermined time interval, such that a level of said interpolated inversion detection signal is held for said predetermined time interval to cause said compensation means to compensate said demodulated signal.

6. An information reproduction apparatus for reproducing a frequency modulated signal, said information reproduction apparatus having demodulation means for demodulating said frequency modulated signal and outputting a demodulated frequency modulated signal having a magnitude, and deemphasis means for deemphasis of the demodulated frequency modulated signal, comprising:

(a) detection means for detecting an inversion of levels of said demodulated frequency modulated signal to produce an inversion detection signal, said inversion being such that said demodulated signal does not correspond to said frequency modulated signal when said frequency modulated signal represents an image of an edge portion, said detection means having:

first comparing means for detecting whether or not said magnitude of said demodulated signal is less than a first predetermined magnitude corresponding to a dark clip level;

delay means for delaying said demodulated signal for a predetermined interval;

second comparing means for detecting whether or not a magnitude of said delayed demodulated signal is less than a second predetermined magnitude corresponding to a black tone, said second predetermined magnitude being different from said first predetermined magnitude; and logic means for producing said inversion detection signal when said magnitude of said delayed demodulated signal is less than said second predetermined magnitude and when said magnitude of said demodulated signal is less than said first predetermined magnitude; and (b) compensation means for compensating said demodulated signal, said compensation means having switch means responsive to said inversion detection signal by outputting as a compensated demodulated signal one of said demodulated frequency modulated signal or a predetermined level corresponding to a white clip level, the compensated demodulated signal being supplied to said deemphasis means.

7. An information reproduction apparatus for reproducing a frequency modulated signal as claimed in claim 6, further comprising:

dropout detection means responsive to said first and second comparing means for detecting dropout of said demodulated signal and for producing a dropout detection signal when said magnitude of said delayed demodulated signal is not less than said second predetermined magnitude and when said magnitude of said demodulated signal is less than said first predetermined magnitude; and dropout compensation means responsive to said dropout detection signal for compensating said demodulated frequency modulated signal.

8. An information reproduction apparatus for reproducing a frequency modulated signal as claimed in claim 6, wherein said detection means further comprises:

dropout detection means for detecting whether or not said inversion detection signal is successively detected over a predetermined interval and for providing an output signal indicative of successive detection of said inversion detection signal to said compensation means for causing said compensation means to compensate said demodulated signal.

9. An information reproduction apparatus for reproducing a frequency modulated signal as claimed in claim 6, further comprising:

second detection means for detecting whether or not said inversion detection signal is detected more than once in a predetermined time interval; and interpolating means for producing an interpolated inversion detection signal when said inversion detection signal is detected more than once in said predetermined time interval, such that a level of said interpolated inversion detection signal is held for said predetermined time interval to cause said compensation means to compensate said demodulated signal.

* * * * *